Sept. 16, 1952 W. C. CARLISLE ET AL 2,610,644
MEANS OF RESILIENT DAMPING OF PRESSURE BELLOWS
Filed Jan. 27, 1951 3 Sheets-Sheet 1

WILLIS C. CARLISLE
JOHN H. McCARVELL
INVENTORS.
BY Lester B. Clark
ATTORNEY.

Sept. 16, 1952  W. C. CARLISLE ET AL  2,610,644
MEANS OF RESILIENT DAMPING OF PRESSURE BELLOWS
Filed Jan. 27, 1951  3 Sheets-Sheet 2

INVENTOR.
WILLIS C. CARLISLE
BY JOHN H. McCARVELL
Lester B. Clark
ATTORNEY.

Sept. 16, 1952     W. C. CARLISLE ET AL     2,610,644
MEANS OF RESILIENT DAMPING OF PRESSURE BELLOWS
Filed Jan. 27, 1951     3 Sheets-Sheet 3

INVENTORS
WILLIS C. CARLISLE
BY JOHN H. McCARVELL
Lester B. Clark
ATTORNEY

Patented Sept. 16, 1952

2,610,644

UNITED STATES PATENT OFFICE 2,610,644

MEANS OF RESILIENT DAMPING OF PRESSURE BELLOWS

Willis C. Carlisle and John H. McCarvell, Houston, Tex., assignors to Macco Oil Tool Company, Houston, Tex., a partnership Application January 27, 1951, Serial No. 208,202

9 Claims. (Cl. 137—155)

The invention relates to a valve construction of the general type known as a flow valve to be used in a well to control the flow of presure fluid in elevating the well fluids to the surface.

It has been found that in the operation of this general type of flow valve that the vibration of the opening and closing of the valve is imparted to the pressure bellows or that the pressure bellows are subjected to a change in pressure and vibration thereof.

These vibrations are of a relatively high frequency, possibly of the order of thousands of vibrations per minute. With this tremendous vibration, it has been found soon crystalizes the very thin wall structure of the bellows with the result that 90% of the bellows which are introduced in such wells are destroyed by the vibration. It is needless to say that such vibration is detrimental and causes wear on the other parts of the valve construction.

It is one of the objects of the present invention to provide a means and a method of damping such vibrations by the interference of the vibrating parts by contact or engagement with some other device which is not as a matter of fact vibrating at the time.

It is also one of the objects of the invention to embody a resilient damping structure upon the moving or vibrating parts of the flow valve to engage with the housing which supports the valve structure so that the tremendous vibration of the parts will be damped to such an extent that a large majority of the vibration is entirely eliminated with the result that the bellows will operate for almost an indefinite period due to the elimination of a major portion of such vibration.

Another object of the invention is to provide a flow valve assembly including a housing and a unitary insert assembly which may be quickly and easily inserted and removed from the housing in event that any of the parts which are subjected to vibration or movement or wear can be readily replaced in a few moments time by removing such parts as a unit.

Another object of the invention is to provide a flow valve unit including the valve, stem, bellows, and a closure plug as an insertable and removable unit which may be readily replaced with respect to the value housing or structure proper.

Still another object of the invention is to provide a unitary device including a plug having a pressure bellows affixed thereto with a valve stem also affixed to the opposite end of the bellows so that the plug, bellows, and valve, may be inserted or removed from the flow valve housing as a unit.

A still further object of the invention is to provide an insertable flow valve unit including a closure plug for the flow valve housing along with a pressure valve, a stop nipple therein, and a valve stem including an enlarged housing so as to cushion the movement of the valve with respect to the bellows, and in order to provide an enlarged pressure area subjected to variation upon movement of the valve.

A still further object of the invention is to provide a flow valve with the resilient damping means so as to minimize vibration of the parts and to apply such damping means to a removable valve assembly for the flow valve.

A still further object of the invention is to provide a valve for use in a flow valve assembly which has a stem connected to the pressure bellows and to which a vibration damping device has been added.

It is also an object to provide the combination with a flow valve and tubing of the damping device and a check valve so as to provide control of the valve and well flow regardless of whether the valve is actuated by the load of well liquid in the tubing or whether the actuation is due to pressure fluid applied in the casing.

Other and further objects of the invention will be readily apparent when the following description is considered in connection with the accompanying drawings wherein.

Figs. 1 and 2 present a side elevation showing a housing in section and illustrating the internal portions of the valve insert assembly in elevation.

Figure 1:
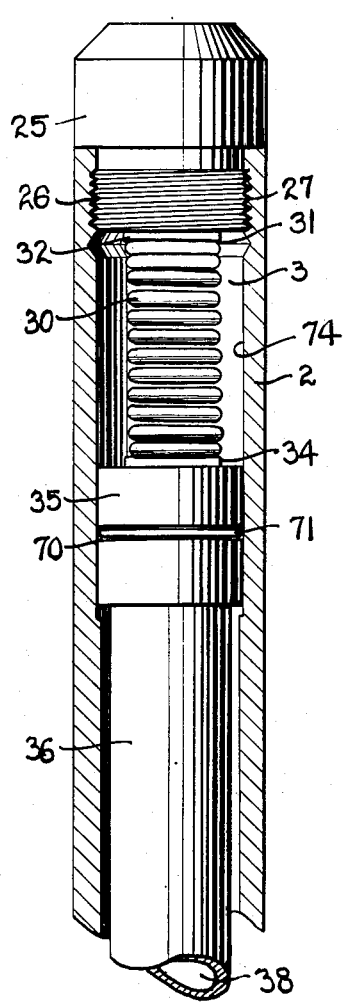
Figure 2:
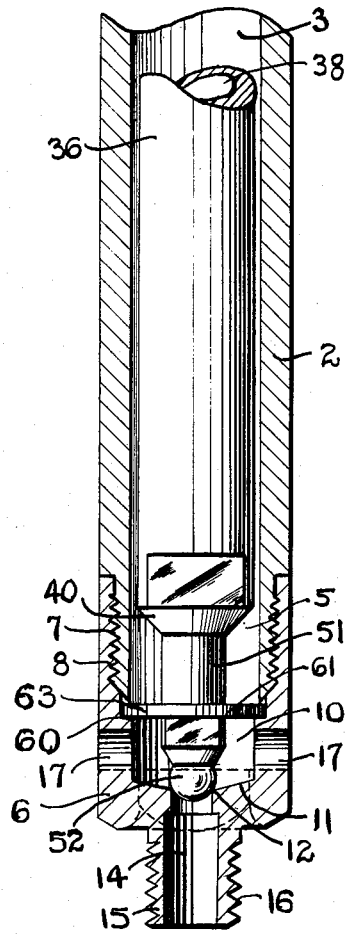

In Figs. 1 and 2 a hollow tubular housing 2 has been shown which is open at each end to provide a chamber 3 extending through the housing. The lower end 5 of said housing is closed by a base 6 which is threaded at 7 onto the lower somewhat reduced end 8 of the housing 2.

This base closure is hollowed at 10 and reduced in size at 11 in order to provide a valve seat 12. Extending from the seat 12 is a flow passage 14 which extends through the lower reduced end 15 of the base which is threaded at 16 for connection to a well tubing 18 or support device 80 for supporting the entire flow valve.

The lateral inlet openings 17 extend through the wall of the base 6 so that in combination the flow passage 15, chamber 10 and the inlet ports at 17 provide a passage for pressure fluid either to or from the tubing 18. It is to be understood that in some instances the valve is operated by the pressure in the tubing due to the load or column of oil so that such pressure will be exerted in the chamber 3 against the bellows 30 and the valve 36 to open the valve 12.

Figure 5:
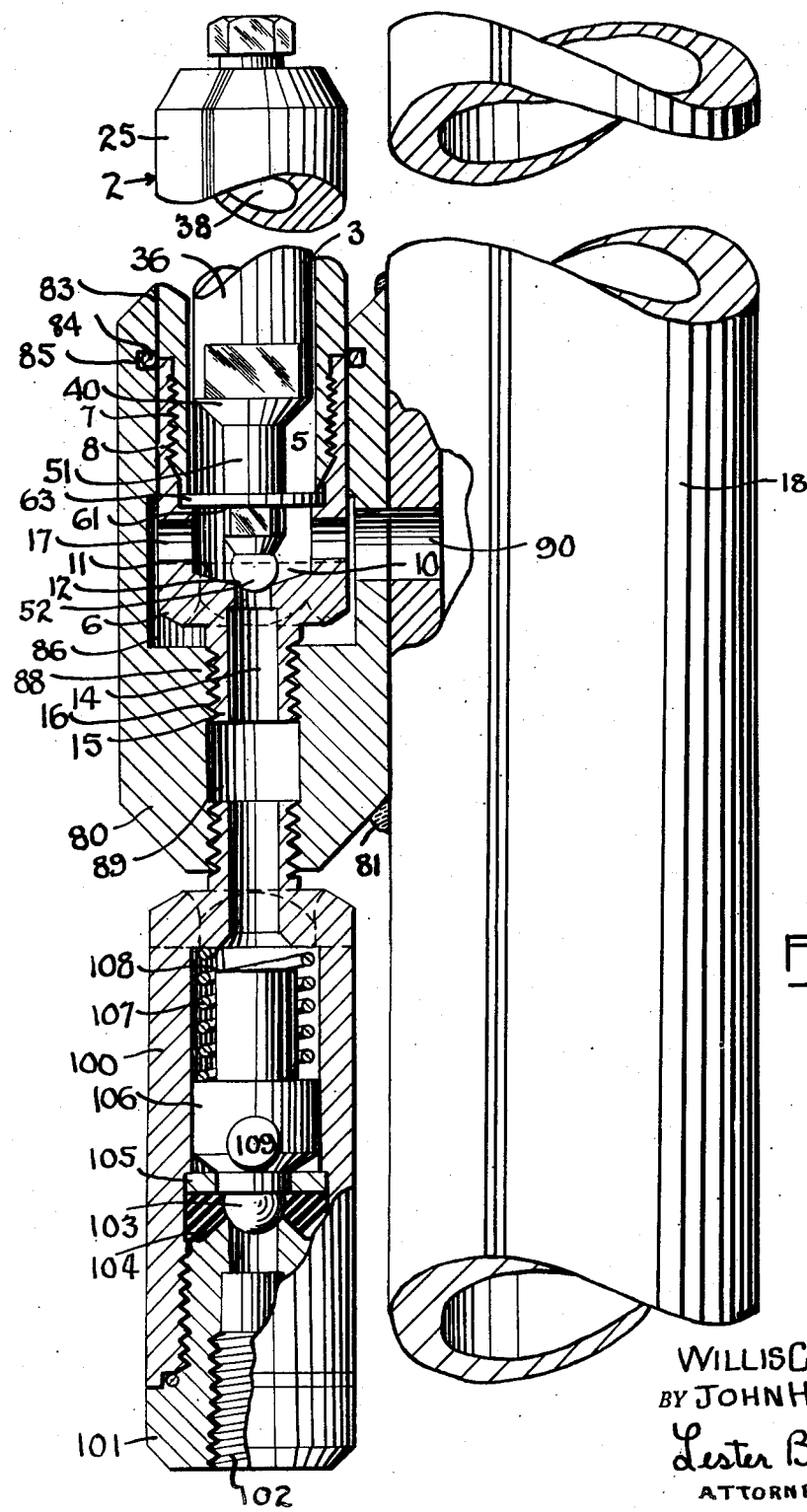
Fig. 5 shows a tubing supporting the flow valve, damping device and a check valve in assembly where the valve may be attached by the load of liquid in the tubing or by the pressure fluid in the casing.

When the valve 12 opens the pressure fluid in the well casing around the tubing 18 of Fig. 5 will come upwardly through the check valve 100 and passage 14 to be restricted by the valve upon the seat 12. In other instances pressure fluid of sufficient pressure is introduced into the well casing and tends to open the valve on the seat 12 either with or without the tubing pressure to flow into the inlet 14, and is restricted by the valve on the seat 12. When such valve is open, the pressure fluid is admitted through the inlet 14 to the chamber 10 and ports 17 so that it may enter the tubing to elevate the well liquid therein.

Figure 3:
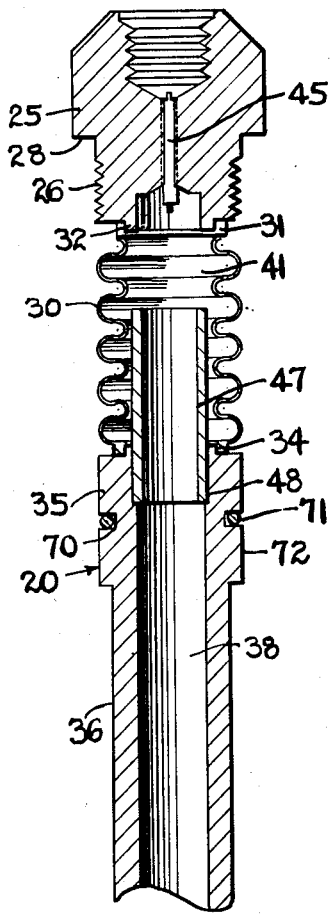
Figs. 3 and 4 are vertical sectional views of the valve insert assembly per se with the parts arranged in the position that they will be inserted in the housing of Figs. 1 and 2.
Figure 4:
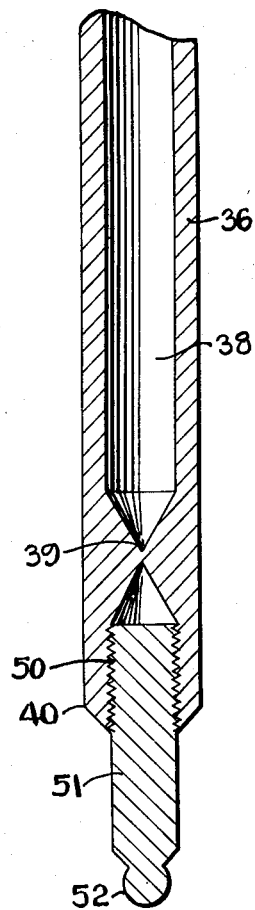

Figs. 3 and 4 show a valve pressure control assembly indicated generally by the numeral 20 in Fig. 3. This assembly reading from the top in Fig. 3 embodies a plug 25 threaded at 26 to be received in the threads 27 in the upper end of the housing 2. The shoulder 28 on the plug is arranged to engage the end of the housing in order to form a closure for the housing.

Connected to the lower end of the plug is a pressure bellows 30 of well known construction in that it is in the form of a corrugated thin tubular sheet metal which will expand and contract upon the application of pressure to the exterior thereof. This hollow bellows 30 is affixed at 31 to the lower end 32 of the plug and extends downwardly where it is affixed at 34 to the upper end 35 of an elongate valve stem 36.

This valve stem is best seen in Figs. 3 and 4 and constitutes a relatively thick walled tubular member which has substantial weight as compared with the valve stems heretofore known in the art.

This stem is provided with a hollow chamber 38 which extends from the upper end downwardly to a point 39 adjacent the lower end 40 of the stem.

It should be obvious that the chamber 41 inside of the bellows opens into the chamber 38 in the valve stem so that the two, as a matter of fact, form a continuous pressure chamber.

A suitable valve or injection device 45 is shown diagrammatically in the plug 25 by which any desired pressure may be injected into the chambers 38 and 41 of the bellows and the valve stem respectively.

The provision of this exceptionally large pressure chamber in the control unit 20 serves to cushion the vibration and makes the valve operation much more sensitive because of the large cushioning area so that any pressure applied to the assembly tending to move it upwardly in the opening of the valve will result in the compression of all of the gaseous fluid in the chambers 38 and 41.

As distinguished from the foregoing, if the pressure variation volume were only that of the chamber 41 in the bellows then it seems obvious that a pressure would have to be provided so that there would be very small variation in the applied pressure to cause opening or a reduction of such pressure to cause closing of the valve. In the present device, the lower pressure which is possible with the enlarged cushion chamber permits a greater variation in the applied and released pressures in the valve housing in order to control the movement of the valve.

In order to protect the bellows against excessive pressures and excessive opening movement of the valve member tending to collapse the bellows, a stop nipple 47 has been disposed in the counter-bored opening 48 in the upper end of the valve stem chamber 38.

The lower end of the valve stem is internally threaded at 50 to receive a valve member 51 which has a ball valve 52 extending from the lower end thereof. This ball valve 52 is of a size to engage the seat 12 in the base cap 6 of the housing in order to close the flow passage through the valve regardless of whether the flow is through the opening 17 or whether it occurs inwardly through the passage 14.

As indicated heretofore, it has been found in actual practice that the arrangement of valves of this general type result in a tremendous vibration in the opening and closing of the valve member because of the application and removal of pressure thereto during such operation.

It is desirable, therefore, to prevent excessive wear as between valve 52 and the seat 12 to provide a guide for the valve member 51 so as to insure the proper seating of the valve. To accomplish this arrangement, a shoulder 60 has been provided in the chamber 10 of the base plug upon which a guide plate 61 may rest. This guide plate is freely movable and will seat on the shoulder 60 by gravity. The plate may have a plurality of holes 63 therein so that any pressure occurring in the chamber 10 will also be available in the chamber 5 which chambers might be said to be in constant connection with each other due to these openings 63.

This guide plate 61 in this manner prevents lateral vibration of the valve 52.

As will be apparent from the foregoing, the entire valve stem 36 is subjected to vertical vibration due to the bellows construction 30 and the variations in the pressures during the flowing operation for the fluid in the well.

While it was indicated that such vibration might be of the order of several thousand vibrations per minute, it might be stated that the vibrations may run as high as a million vibrations per 24 hours.

The result of these vibrations will cause the valve stem to move vertically in the chamber 3 very rapidly, and in order to prevent lateral movement or vibration, the enlarged collar 35 was provided on the upper end of the valve stem. This collar fits relatively snugly in the chamber 3 but is freely slidable therein to negotiate vertical vibration or sliding movement.

In order to prevent the setting up of a resonant vibration in the part due to the variation in pressure, the collar 35 is shown as having been provided with an annular groove 70 which is of a depth, width and size to receive a resilient damping device or ring 71. Such ring may be in the nature of what is generally known in the art today as an O ring. Such rings are annular rubber or comparable rings which have a circular cross section and they may be snapped into position into the groove 70 to extend slightly beyond or flush with the surface 72 of the collar 35.

This resilient damping ring 71 will thus bear relatively lightly against the inside wall or surface 74 of the chamber 3 on the inside of the housing 2. This contact will be sliding but of a sufficiency such that it will interfere with the vibration of the valve stem and the bellows with a view of cutting down on the vibration which is applied to the bellows.

It seems obvious that the result of this means and method of damping the vibration should result in a tremendous extension in the serviceable life of the valve stem, bellows, the seat and the moving and contacting parts of the entire flow valve device.

The pressure acts the same whether it be admitted from the tubing or from the casing as is well known.

In actual practice, this tremendous reduction in vibration has actually been accomplished.

As heretofore indicated, this entire control assembly of Figs. 3 and 4 including the valve stem, bellows and closure plug will be provided as a unit, which may be readily inserted in the housing 2 and engaged by the threads 26 and 27 to securely close the valve housing and provide various chambers as heretofore described.

The entrance of pressure into the chambers 5 and 10 will equalize through the opening 63 in the guide plate, and this equalization will occur throughout the chamber about the exterior of the stem and the bellows. As this pressure increases, a collapsing of the bellows will occur which results in the raising of the valve member 52 from the seat 12 so as to open the flow passage regardless of whether the flow be inwardly or outwardly relative to the port 17 and the passage 14.

Fig. 5 shows the combination arrangement of the tubing, a socket 80 affixed at 81 by weld material on the side of the tubing so that it will be lowered into position in the well and this socket will serve as a support for the flow valve 2 described in Figs. 1, 2, 3, and 4 inclusive. This flow valve will have the body portion 2 inserted in the opening 83 of the socket so that the flow valve will fit snugly in the seal ring 84 which is disclosed in a recess 85 in the socket.

The socket is enlarged at 86 so as to provide a chamber about the base of the flow valve where it is threaded at 16 into the threaded portion 88 of the socket. In this manner, the passage 89 of the socket will serve as a continuation of the flow passage 14.

The passages 17 of the flow valve will open into the chamber 86, and this chamber will pass through the wall of the socket and through the opening 90 into the tubing so that the flow of well fluid or pressure fluid may flow in or out of the tubing as circumstances may justify.

In some instances, it is desirable to provide a check valve 100 on the lower end of the socket, and such a check valve is shown as embodying a base 101 which has an opening 102 therethrough. The check valve member 103 is disposed inside of a washer 104 and supported upon and arranged to fit within a ring 105 so that the valve body 106 will be urged to closed position by a coil spring 107 disposed inside of the check valve chamber 108. With this arrangement, the flow of the check valve will pass through the lateral passage 109 so as to permit a flow when the valve is raised due to pressure entering the passage 102. This particular check valve is shown in combination herewith but is described in detail in our co-pending application for a Check Valve, Serial No. 219,808, filed April 7, 1951.

The general combination of Fig. 5 relates to the tubing, the socket, the removable seal in place flow valve, the check valve as an assembly for use in a well bore.

Broadly, the invention contemplates a means and method of damping the vibration due to the operation of a pressure bellows in a flow valve or in any other location where such pressure bellows are subjected to pressures and vibration.

The invention also contemplates the provision of a replaceable valve and pressure bellows control unit for a flow valve.

What is claimed is:

1. A flow valve for control of the pressure fluid into a well tubing comprising a housing, a chamber therein, inlet ports for the flow of pressure fluid, a flow passage for such fluid from said chamber into the well tubing, a seat at said passage, a valve member disposed in said chamber to engage and disengage said seat, an elongate weighted stem on said valve, a cap closing the top of said housing, a bellows having its upper end sealed to said cap, means sealing its lower end to the top of said stem, said means including a collar on said stem approximating the size of, but slidable in said housing chamber, a stop nipple in said bellows to limit collapsing of said bellows, and a resilient bellows damping device carried by said stem to contact said chamber to protect said bellows against vibration.

2. A flow valve for control of the pressure fluid into a well tubing comprising a housing, a chamber therein, inlet ports for the flow of pressure fluid, a flow passage for such fluid from said chamber into the well tubing, a seat at said passage, a valve member disposed in said chamber to engage and disengage said seat, an elongate weighted stem on said valve, a cap closing the top of said housing, a bellows having its upper end sealed to said cap, means sealing its lower end to the top of said stem, said means including a collar on said stem approximating the size of, but slidable in said housing chamber, a stop nipple in said bellows to limit collapsing of said bellows, a resilient bellows damping device carried by said stem to contact said chamber to protect said bellows against vibration, and a guide plate disposed in said chamber and about said stem to insure engagement of said valve member on said seat.

3. A pressure fluid flow control valve for wells comprising a housing, a chamber therein, a passage to and from said chamber, a valve seat in said passage adjacent one end of said chamber, a valve assembly insertable through the other end of said housing, a plug on said assembly to close said housing, an elongated valve stem included in said assembly, a valve on said stem for said seat, a charged bellows affixed to said plug and stem, a groove in the periphery of said stem, and a resilient spring ring disposed in said groove to normally contact the surface of the housing chamber to damp the vibration of said bellows.

4. A pressure fluid flow control valve for wells comprising a housing, a chamber therein, a passage to and from said chamber, a valve seat in said passage adjacent one end of said chamber, a valve assembly insertable through the other end of said housing, a plug on said assembly to close said housing, an elongated valve stem included in said assembly, a valve on said stem for said seat, a charged bellows affixed to said plug and stem, a groove in the periphery of said stem, and a resilient spring ring disposed in said groove to normally contact the surface of the housing chamber to damp the vibration of said bellows to reduce wear and crystallization thereof.

5. A pressure fluid flow control valve for wells comprising a housing, a chamber therein, a passage to and from said chamber, a valve seat in said passage adjacent one end of said chamber, a valve assembly insertable through the other end of said housing, a plug on said assembly to close said housing, an elongated valve stem included in said assembly, a valve on said stem for said seat, a charged bellows affixed to said plug and stem, a groove in the periphery of said stem, and a resilient spring ring disposed in said groove to normally contact the surface of the housing chamber to damp the vibration of said bellows, said stem having an elongate cavity therein opening into said bellows to cushion the bellows action.

6. A pressure fluid flow control valve for wells comprising a housing, a chamber therein, a passage to and from said chamber, a valve seat in said passage adjacent one end of said chamber, a valve assembly insertable through the other end of said housing, a plug on said assembly to close said housing, an elongated valve stem included in said assembly, a valve on said stem for said seat, a charged bellows affixed to said plug and stem, a groove in the periphery of said stem, and a resilient spring ring disposed in said groove to normally contact the surface of the housing chamber to damp the vibration of said bellows, said stem having an elongate cavity therein opening into said bellows to cushion the bellows action, and a stop nipple in said bellows to limit the collapsing action and opening of the valve.

7. A flow valve assembly including a hollow housing for connection to the well tubing, a closure base on said housing having inlet and outlet ports for a flow of pressure fluid through the housing and chamber, a valve seat at one of said openings, a pressure charged bellows valve unit insertable in the open end of said housing and including a closure plug, bellows, valve, and stem, said bellows being affixed to said plug and stem, said stem having a hollow cavity therein opening into said bellows so as to in effect provide a more sensitive bellows operation, said stem carrying said valve to engage said seat, and a vibration damping device on said stem adjacent said bellows to slidably contact the housing chamber wall to minimize vibration of said bellows stem and valve.

8. The combination with a pressure charged bellows, a housing thereabout, means connected to and for actuation by said bellows to, as a function of the pressure in the housing and about said bellows to compress and release the bellows to control the flow of a pressure fluid through said housing, and a vibration damping device disposed between said means and housing to interfere with and damp the vibration of said means and bellows.

9. The combination with a pressure charged bellows type flow valve for wells including a housing, of a passage through said housing from the well and into the well tubing of a damping device for the valve and bellows, and a check valve carried by the flow valve for the pressure fluid flow.

WILLIS C. CARLISLE.
JOHN H. McCARVELL.

REFERENCES CITED

The following references are of record in the file of this patent:

UNITED STATES PATENTS

| Number | Name | Date |
|---|---|---|
| 1,884,548 | Boynton | Oct. 25, 1932 |
| 2,250,464 | Boynton | July 29, 1941 |
| 2,342,301 | Peters | Feb. 22, 1944 |
| 2,556,867 | Carlisle | June 12, 1951 |